United States Patent [19]

Tanamachi et al.

[11] Patent Number: 4,490,666
[45] Date of Patent: Dec. 25, 1984

[54] CONTROL OF INDUCTION MOTOR USING PWM INVERTER

[75] Inventors: Tokunosuke Tanamachi; Hiroshi Narita; Masahiko Ibamoto; Shigetoshi Okamatsu, all of Katsuta,, Japan

[73] Assignee: Hitachi, Ltd., Tokyo, Japan

[21] Appl. No.: 406,788

[22] Filed: Aug. 10, 1982

[30] Foreign Application Priority Data

Aug. 21, 1981 [JP] Japan .................................. 56-131740

[51] Int. Cl.³ .............................................. H02P 7/42
[52] U.S. Cl. ...................................... 318/800; 318/802
[58] Field of Search .............................. 318/798–811, 318/318, 309–311, 139

[56] References Cited

U.S. PATENT DOCUMENTS

4,281,276 7/1981 Cutler ................................... 318/810
4,295,189 10/1981 Boys ..................................... 318/811

Primary Examiner—E. A. Goldberg
Assistant Examiner—A. Evans
Attorney, Agent, or Firm—Antonelli, Terry & Wands

[57] ABSTRACT

For controlling the rotational speed of an induction motor, an inverter is provided which converts direct current to alternating current and feeds the converted current to the motor. The output voltage and frequency of the inverter is controlled by a pulse-width modulated control device. The number of pulses contained in a half cycle of the inverter output voltage are changed every time the inverter output frequency reaches one of plural predetermined reference values. The plural predetermined reference values are adjusted in accordance with the DC supply voltage and/or with the motor current.

20 Claims, 9 Drawing Figures

CONTROL OF INDUCTION MOTOR USING PWM INVERTER

BACKGROUND OF THE INVENTION

1. Field of the Invention

The present invention relates to an improvement of the control of an induction motor by a pulse-width-modulated inverter, relating, in particular, to a control that can be fitted to a vehicle driven by induction motors.

2. Description of the Prior Art

As is commonly known, the output voltage and frequency of a pulse-width-modulated inverter can be controlled and is thus suitable for a speed control for an induction motor.

In electric railways, what is called the induction motor type of vehicle using an induction motor, which is convenient for handling and can be expected to have high adhesion characteristics (the friction force between wheels and rail), is being put to practical use.

The main circuit of the induction motor propulsion vehicle consists of an inverter taking in direct current obtained from a direct-current catenary, or from an alternating-current catenary through a rectifier, and providing the induction motor with an alternating current. It is desirable that this inverter is controlled by pulse width modulation (hereinafter referred to as PWM). A typical control system detects the rotational speed $f_n$ of the induction motor and adds or subtracts a prescribed slip frequency $f_s$. Addition is made during power operation, while subtraction is made during regeneration. The value $f_o$ ($=f_n \pm f_s$) thus obtained becomes an instruction for the output frequency of the inverter. Meanwhile, the current in the induction motor is measured and compared with a current instruction. A constant-current control system adjusting the output voltage of the inverter is constituted so that the deviation of the detected value from the value of the instruction becomes zero.

Signals for adjusting this frequency and voltage are input to a PWM control device and the gates of the switching elements constituting the inverter are controlled.

The PWM control device generates a sine wave (the fundamental-wave pattern) having a frequency corresponding to said frequency instruction $f_o$ and a triangular carrier wave used for modulation having a frequency that is an integral multiple of $f_o$. The peak value of the sine wave is controlled by said variations of current, and is compared with the triangular wave. The result of the comparison becomes a signal indicating the period wherein the status of said switching elements is to be continued or not.

The multiple by which the frequency of the triangular wave is greater than that of the sine wave is the number of voltage pulses within a half-cycle of the output voltage of the inverter. The width of each pulse is adjusted so that the average value of the output voltage is controlled.

There is an optimum number of pulses contained in a half cycle of the output voltage of the inverter value in connection with the rotationed speed of the induction motor. The number of pulses is changed in a sequence related to the rotationed speed.

SUMMARY OF THE INVENTION

The purpose of the present invention is to provide a control for an inverter by pulse width modulation whereby the inverter can be commutated surely even at small amounts of commutation.

Another purpose of this invention is to provide a control for the inverter by pulse width modulation whereby the torque fluctuations of the induction motor can be reduced.

As one feature of the present invention, a means is provided whereby a reference value, which relates to the rotational speed of the induction motor, for changing the number of pulses in a half cycle of the output voltage of the inverter is adjusted according to the direct-current voltage input to the inverter.

As another feature of the present invention, a means is provided whereby the reference value, which relates to the rotational speed of the induction motor, for changing the number of pulses contained in a half cycle of the output voltage of the inverter is adjusted according to the current of the motor.

As still another feature of the present invention, a constant-current control system controlling the current of the motor at a prescribed level is provided; and further, a means is provided whereby the reference value, which relates to the rotational speed of the induction motor, for changing the number of pulses contained in a half cycle of the output voltage of the inverter is adjusted according to motor current instructions given to the constant-current control system.

The reference value relating to the rotational speed of the induction motor not only sets the reference value on the detected rotational speed, it also makes it possible to set a reference value for the output frequency instructions for the inverter, or set a reference value on the detected output voltage of the inverter, since the output voltage of the inverter is also proportional to the rotational speed of the induction motor.

The following is an explanation of the principle of one embodiment of the present invention.

DETAILED DESCRIPTION OF THE INVENTION

Figure 1:
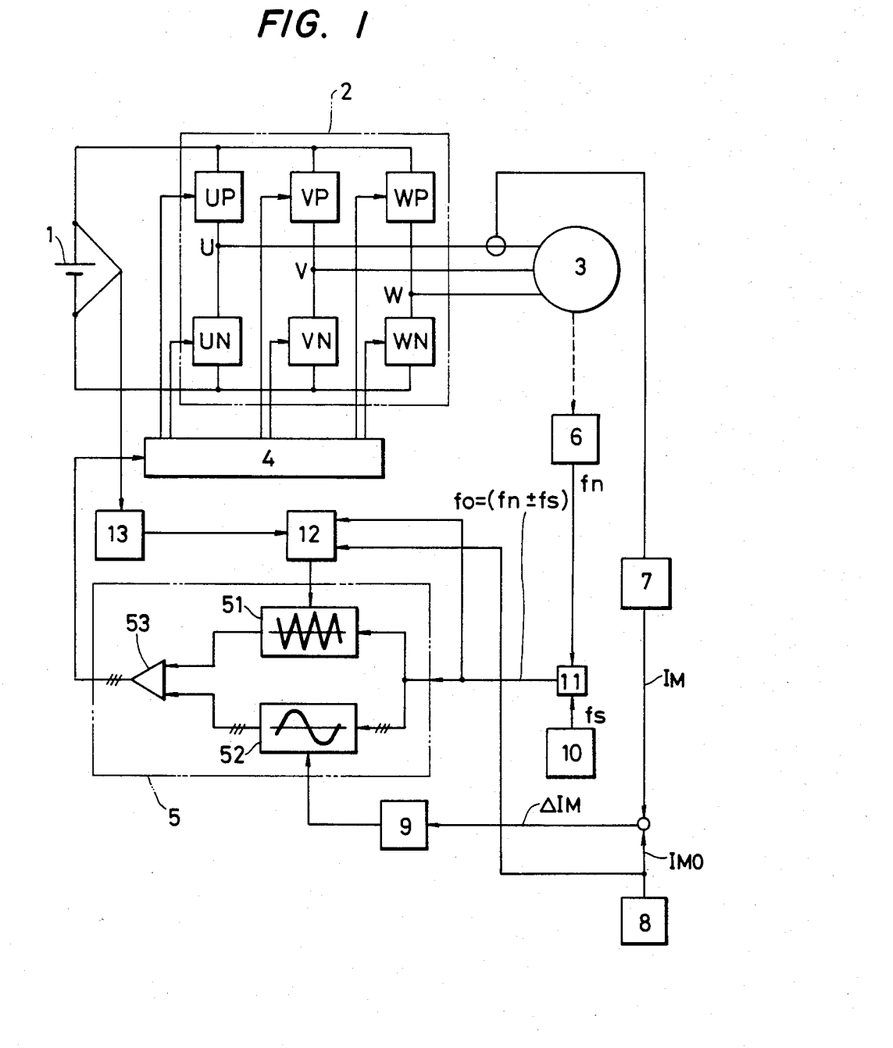
FIG. 1 is a block diagram of an electrical control showing a preferable embodiment of a method for controlling an induction motor by a pulse-width-modulated inverter offered by the present invention.

In FIG. 1, 1 is a DC supply source, 2 is a pulse-width-modulated inverter composed of switching elements UP to WN, such as GTOs (gate turn-off thyristors) and thyristors, and 3 is an induction motor.

The revolution frequency $f_n$ of the induction motor 3 is detected by a detection circuit 6, and during power operation, a slip-frequency instruction value $f_s$ from a slip-frequency instruction circuit 10 is added to the detected value in an adder circuit 11, while during the regenerative braking operation it is subtracted therefrom in the same circuit. The value thus obtained becomes an output frequency instruction $f_o$ ($=f_n \pm f_s$) to the inverter 2. A triangular-wave voltage whose frequency is an integral multiple of $f_o$ ($=f_n \pm f_s$), and a three-phase sine-wave voltage whose frequency is $f_o$ ($=f_n \pm f_s$), are generated synchronously in a triangular-wave generating circuit 51 and a sine-wave generating circuit 52 respectively, in a modulation circuit 5, based on the output received from the adder circuit 11. The triangular-wave voltage and sine-wave voltage are compared with each other in each phase in a comparison circuit 53. Based on the output of this comparison circuit 53 of the moudlation circuit 5, the switching elements UP–WN of the inverter 2 are turned on or off in a prescribed sequence through a gate signal processing circuit 4. The pulse-width modulation operation at this time is explained hereunder with reference to FIG. 2 by taking as an example the case wherein the frequency of the triangular-wave voltage is three times that of the sine-wave voltage.

Figure 2:
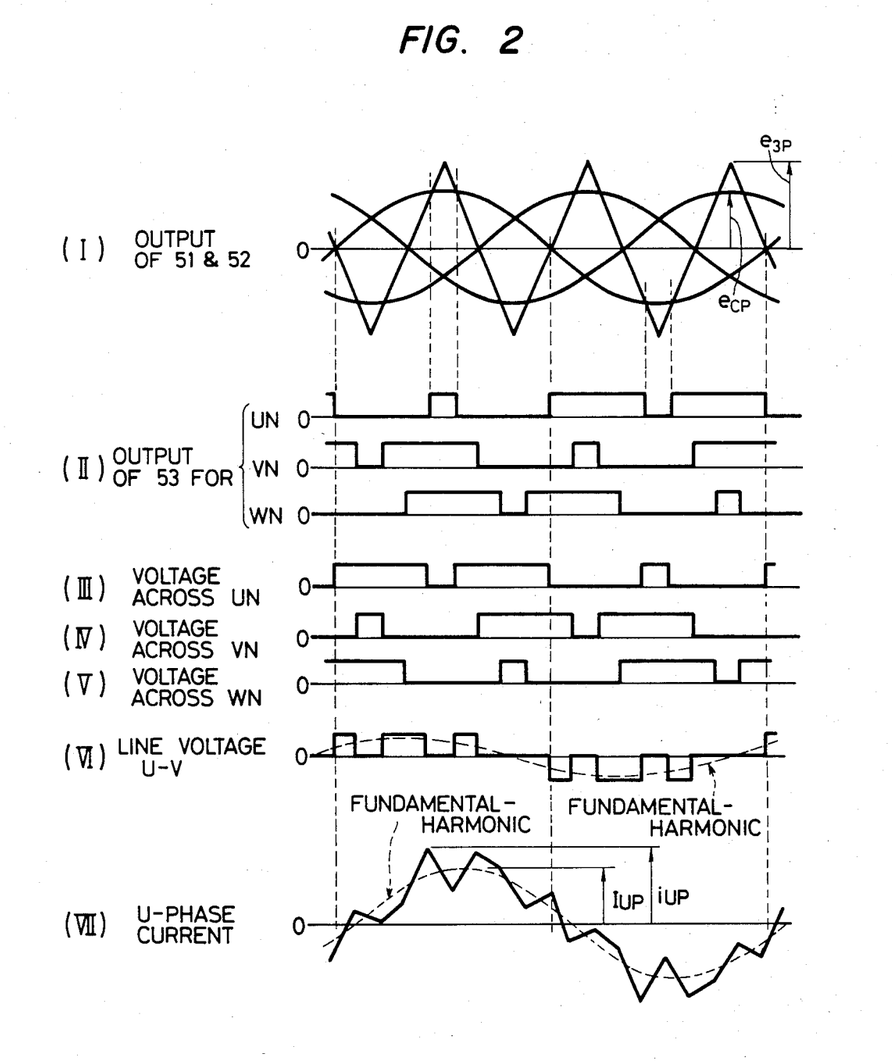
FIG. 2 is a timing chart of the voltage and current of each part for illustrating one example of the PWM operation in a three-pulse mode of the output voltage of the inverter.

A triangular-wave voltage and a three-phase sine-wave voltage as shown in FIG. 2(I) are generated in the triangular-wave generating circuit 51 and the sine-wave generating circuit 52, respectively, and these voltages are compared with each other in each phase in the comparison circuit 53, to generate on-off signals for the switching elements UN, VN and WN of the inverter 2, as shown in FIG. 2 (II). Although the on-off signals for the switching elements UP, VP and WP are not shown in the Figure, they are the inversions of the signals shown in FIG. 2 (II). When the on-off operations are conducted by inputting the output signals from the comparison circuit 53 as shown in FIG. 2 (II) to the switching elements UN, VN and WN through the gate signal processing circuit 4, the voltages across the terminals of the switching elements UN, VN and WN become those shown in (III), (IV) and (V) of FIG. 2, respectively. Although the voltages across the terminals of each of the switching elements UP, VP and WP are not shown in the Figure, they are the inversions of the voltages shown in (III), (IV) and (V) of FIG. 2. Based on the terminal voltage of UN shown in (III) of FIG. 2 and the terminal voltage of VN shown in (IV) thereof, the voltage between U and V of the inverter 2 (the voltage between the U and V phases of the induction motor 3) is as shown in (VI) of FIG. 2 and thus the number of pulses within a half cycle of the sine-wave voltage, i.e. in a half cycle of the output voltage of the inverter, is three. Although the voltages between V and W, and between W and U of the inverter 2 are not shown in the Figure, they are similar to the voltage between U and V in (VI) of FIG. 2, delayed by 120 and 240 degrees, respectively. The U-phase of the current flowing to the induction motor 3 during this time is shown as a waveform containing harmonic components as shown in (VII) of FIG. 2.

As can be seen from the above explanation, the output voltage of the inverter 2, which is proportional to the width of each pulse in the half cycle of the output voltage of the inverter, can be controlled by changing the ratio $e_{cp}/e_{3p}$ of the peak value $e_{cp}$ of the sine-wave voltage to the peak value $e_{3p}$ of the triangular-wave voltage (hereinafter called the modulation factor). The number of pulses in the half cycle can be changed by altering the ratio $f_3/f_o$ of the frequency $f_3$ of the triangular wave to the frequency $f_o$ of the since wave. The modulation factor thereof is controlled by comparing a value $I_M$ obtained through by measuring the current flowing through the induction motor 3 by a detection circuit 7, with an instruction value $I_{MO}$ of a current instruction circuit 8 and by altering the peak value $e_{cp}$ of the sine-wave voltage of the output of the sine-wave generating circuit 52 according to the variation $\Delta I M$ through a pulse-width controlling circuit 9. The number of pulses in the half cycle can be adjusted, as will be described below, by changing the frequency $f_3$ of the triangular wave output from the triangular-wave generating circuit 51 (hereinafter called the modulation frequency) by the output frequency $f_o$ of the inverter (which can be replaced by the rotational speed $f_n$ of the motor 3 or by the output voltage of the inverter) through a pulse-count change-over circuit 12. That is, a number of reference values for this frequency are set in the change-over circuit 12, and an instruction to change the frequency of the triangular wave is issued therefrom every time $f_o$ reaches one of these frequency reference values.

In this pulse-width-modulated inverter, it is preferable that the higher harmonic components as shown in (VII) of FIG. 2, in the current flowing through the induction motor 3, is restricted by making the modulation frequency as high as possible and increasing the number of pulses contained in the half cycle of the output voltage, so as to lessen torque variations, reduce the current (the maximum value thereof is $i_{up}$ in (VII) of FIG. 2) interrupted by the switching elements UP–WN such as GTOs employed in the inverter 2, and reduce interference to the signal circuit when the motor is used for driving a vehicle. On the other hand, however, it is not good for the switching elements UP–WN such as GTOs employed in the inverter 2 if the modulation frequency is made extremely high to compensate for switching losses. Moreover, since the switching elements UP–WN are not ideal switches, requiring a certain period to extinguish (100–300 $\mu s$ approximately), the range of control of the pulse width, i.e. the modulation factor, is reduced with the increase of the number of pulses in a half cycle of the output voltage of the inverter, and thereby the maximum value of the fundamental harmonic (shown by a broken line in (VI) of FIG. 2) of the output voltage which the inverter can deliver is reduced. This means that it is desirable to reduce the number of pulses contained in a half cycle of the output voltage so as to increase the utilization factor of the voltage of the inverter 2. In addition, as stated before, when the current of the induction motor 3 is controlled so as to have a fixed level by a prescribed slip frequency $f_s$, the ratio between the output voltage of the inverter 2 and the output frequency thereof is controlled as a result to be nearly a fixed value. Therefore, the maximum output voltage the inverter 2 can deliver also needs to increase gradually with the increase of the output frequency of the inverter, i.e. the rotational speed of the induction motor 3. Accordingly, in the high-speed region of the induction motor 3, it is necessary to increase the utilization factor of the voltage of the inverter 2 without increasing the switching losses of the switching elements UP-WN by too much.

Figure 3:
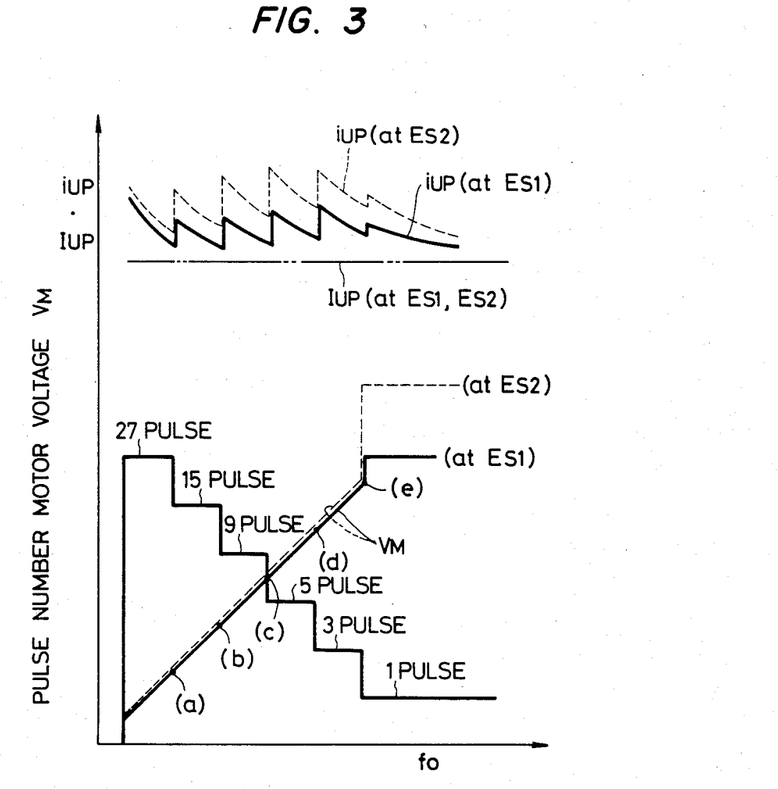
FIG. 3 is a graph of frequency against output voltage of the inverter, and the number of pulses and output current thereof in the PWM operation.

So as to conduct an optimum change in the number of pulses to meet these contrary demands in this way, the number of pulses contained in a half cycle of the output voltage of the inverter is changed in such a manner, for instance, as 27→15→9→5→3→1 as shown by a solid line in FIG. 3, in accordance with the rise in the output frequency $f_o$ of the inverter (or the rotational speed $f_n$ of the induction motor 3). At the same time, the fundamental-harmonic output voltage $V_M$ (shown in (VI) of FIG. 2) of the inverter 2 increases as shown by the solid line of FIG. 3 with the increase of the output frequency $f_o$ of the inverter. The points (a)–(e) on the solid line of the $f_o$–$V_M$ characteristics of FIG. 3 indicate the maximum values of the fundamental-harmonic output voltage $V_M$ the inverter 2 can deliver at a DC supply voltage of $E_{s1}$ and each number of pulses, and it is preferable that the number of pulses is changed at each of these points. Moreover, the relationships between the instantaneous peak value $i_{up}$ and the fundamental-harmonic peak value $I_{up}$ of the current flowing through the induction motor 3, as shown in (VII) of FIG. 2 are as indicated by the solid and dashed lines in FIG. 3, and the capacity (the breakdown current) of the switching elements UP-WN in the inverter 2 is decided by the magnitude of the value of $i_{up}$. If the number of pulses changes to the next value at an output frequency $f_o$ of the inverter which is larger than those shown by the points (a)–(e) in FIG. 3, i.e. at a level exceeding the fundamental-harmonic output voltage $V_M$ which the inverter 2 can deliver, the period needed to extinguish the arc by the switching elements UP-WN of the inverter 2 can not be ensured, and thus the inverter 2 naturally fails to interrupt the current.

However, failures in commutation and fluctuations of torque in the inverter have been observed notwithstanding that settings have been made to obtain the optimum pulse changes, as stated before. It has also become clear through investigation that these are caused by fluctuations of the supply voltage and the change of a reference of motor current.

Figure 4:
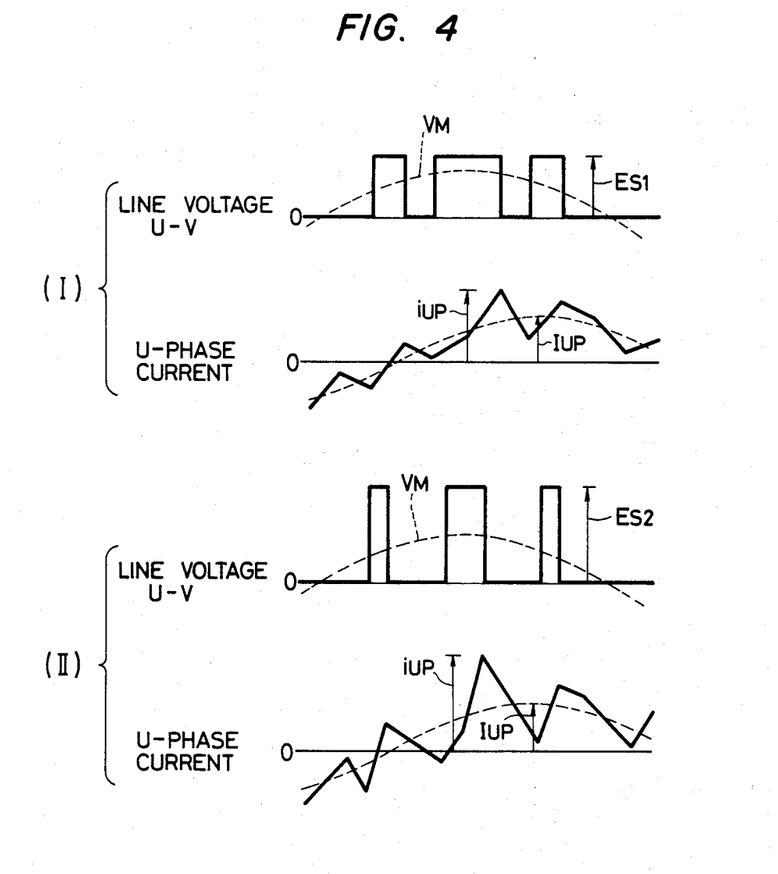
FIG. 4 is comparison charts of line voltage and phase current under different supply voltage conditions.

That is, when the DC supply voltage increases from $E_{s1}$ to $E_{s2}$, the $f_o$–$V_M$ characteristic from 27 pulses to 3 pulses is the same as that shown by the solid line in FIG. 3, since the current of the induction motor 3 is controlled at a fixed level ($I_{up}$ is fixed). However, when the number of pulses becomes one (this may be regarded as the case of $e_{cp} > e_{3p}$ in FIG. 2), the fundamental-harmonic voltage $V_M$ of the inverter 2 abruptly changes as shown by the dashed line in FIG. 3 and thereby large fluctuations of torque are caused. Similarily, when the DC supply voltage increases from $E_{s1}$ to $E_{s2}$, the relationships between the output voltage of the inverter 2 and the current ($i_{up}$) of the induction motor 3 become those shown by (I) and (II) in FIG. 4 taking 3 pulses as an example and thus the instantaneous peak value $i_{up}$ of the current in the induction motor 3 becomes large, and this value $i_{up}$ is increased from that shown by the solid line to that shown by the dashed line in FIG. 3 in relation to each number of pulses. Since the inverter 2 fails to interrupt (commutate) the current then, the capacity (commutation ability) of the inverter 2 must be made large, and the torque pulsations increase as well. In contrast with this, when the DC supply voltage decreases from $E_{s1}$, the maximum value of the fundamental-harmonic output voltage $V_M$ that the inverter 2 can deliver at some number of pulses, e.g. at 27 pulses, falls below the point (a) in FIG. 3 which indicates the case when the DC supply voltage does not decrease. Therefore, if the number of pulses is not changed to the subsequent 15 pulses before the value reaches the point (a), turn off time needed by the inverter 2 as stated before can not be ensured, and thereby the inverter will fail to interrupt (commutate) the current.

Figure 5:
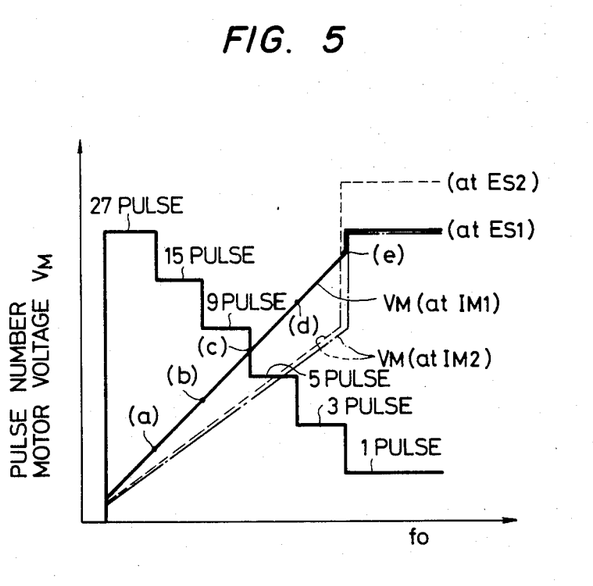
FIG. 5 is a graph of frequency against output voltage of the inverter, and the number of pulses thereof, under different motor current conditions.

Next, when the reference of motor current is reduced from $I_{M1}$ to $I_{M2}$ when the DC supply voltage is $E_{s1}$, the fundamental-harmonic output voltage $V_M$ of the inverter 2 in relation to the output frequency $f_o$ of the inverter changes from that shown by a solid line in FIG. 5 to that shown by dot-dash line therein, and thus the change of the fundamental-harmonic output voltage $V_M$ of the inverter 2 increases when the number of pulses decreases to one, causing large torque fluctuations. The change of the fundamental-harmonic output voltage $V_M$ of the inverter 2 and the torque fluctuations when the number of pulses becomes one are further increased as shown by the dashed line in FIG. 3 when the DC supply voltage increases from $E_{s1}$ to $E_{s2}$. Incidently, the number of pulses, $V_M$ and the points (a)–(e) at which the number of pulses changes in relation to $f_o$ shown by the solid line in FIG. 5 are the same as those when DC supply voltage is $E_{s1}$ in FIG. 3. Moreover, when the value of the reference of motor current becomes larger than $I_{M1}$, the voltage exceeding the maximum value of the fundamental-harmonic output voltage $V_M$ which the inverter 2 can deliver at a given number of pulses, e.g. at 27 pulses, is necessary at the point (a) in FIG. 5, and accordingly, the turn off time needed by the inverter 2 can not be ensured and thus the inverter 2 fails to interrupt (commute) the current.

As stated above, in connection with the changes in the DC supply voltage and in the value of the reference of motor current which become disturbances to the system controlling the output voltage of the inverter, there occur problems in that the torque fluctuations when there is just one pulse become large, the inverter 2 fails to interrupt (commutate) the current and that the instantaneous peak value $i_{up}$ of the current of the induction motor 3 and the torque pulsations thereof increase. When $i_{up}$ increases, the comutation ability of the inverter 2 is required to be large, which makes the inverter 2 large in size.

In view of these problems, first as shown in FIG. 1, the voltage of the DC power source is measured by a detection circuit 13 and vary the set value of the output frequency of the inverter so as to change the number of pulses in a half cycle of the output voltage of the inverter corresponding to the measured value of the output of the power source. These operations will be explained with reference to FIG. 6 and FIG. 7.

Figure 6:
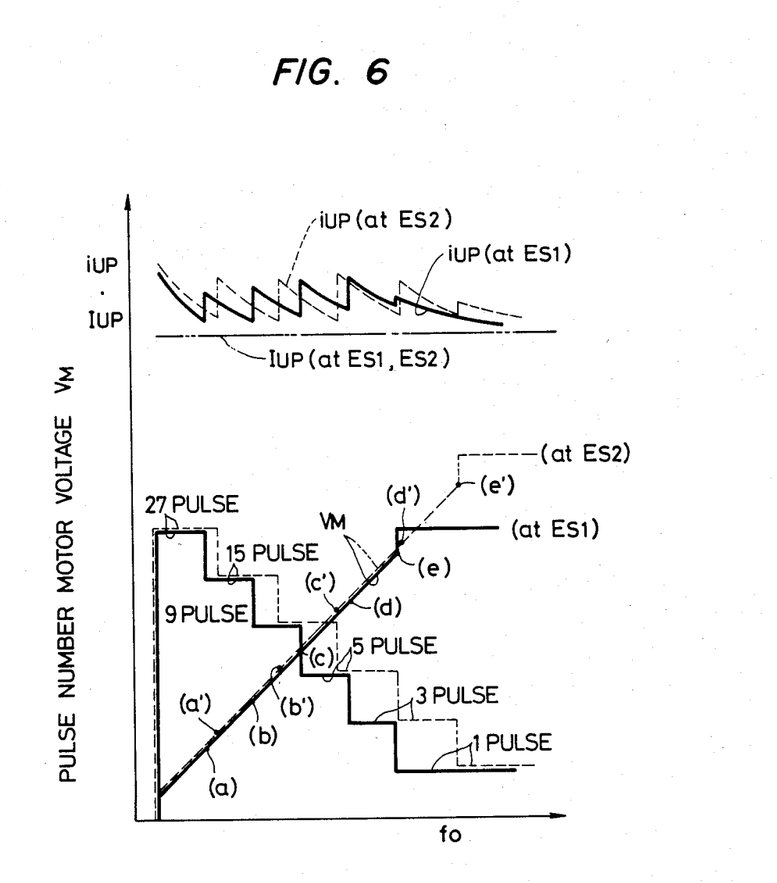
FIG. 6 is a graph showing the PWM operation in one embodiment of the present invention compared with that of FIG. 3.
Figure 7:
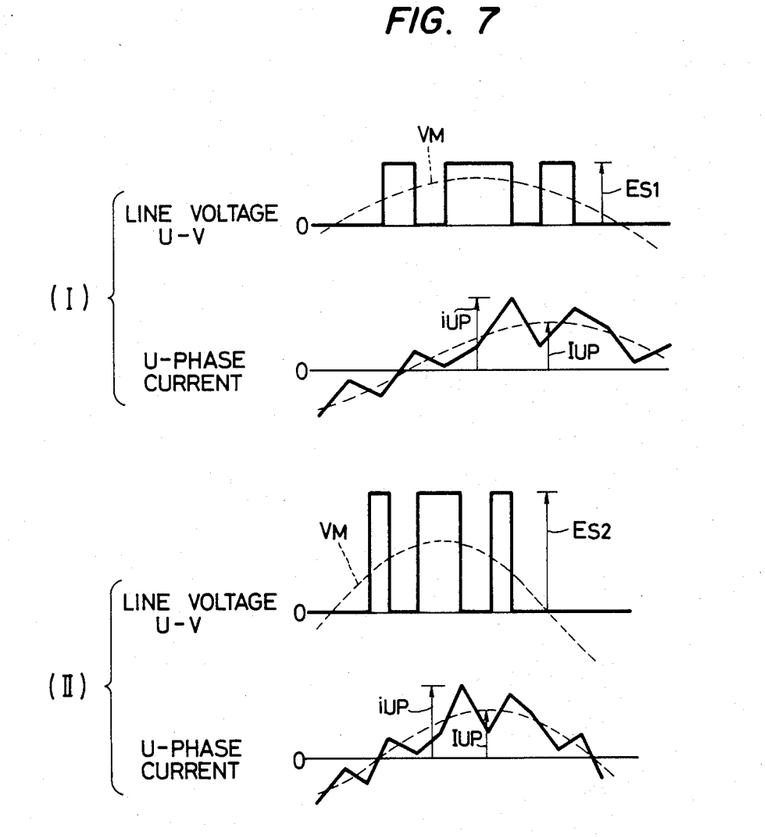
FIG. 7 is comparison charts showing the PWM operation in one embodiment of the present invention compared with those of with FIG. 4.

When the voltage of the DC power source 1 of FIG. 1 increases from $E_{s1}$ to $E_{s2}$, the maximum value of the fundamental-harmonic output voltage $V_M$ which the inverter 2 can deliver at each number of pulses increases as well. Therefore, a set value of the output frequency $f_o$ of the inverter corresponding to this increase for changing each number of pulses in shifted from the points (a)–(e) on the solid line (for $E_{s1}$) in FIG. 6 to the points (a')–(e') on the dashed line (for $E_{s2}$) therein. Then, as can be seen from the dashed line (for $E_{s2}$) in FIG. 6 showing the relationships between the output frequency $f_o$ of the inverter and the fundamental-harmonic output voltage $v_M$ of the inverter 2, the change in the fundamental-harmonic output voltage $V_M$ of the inverter 2, i.e. the torque fluctuations thereof when the number of pulses becomes one, is not so different from that shown by the solid line (for $E_{s1}$) when the DC supply voltge is constant. When the number of pulses becomes three, for instance, both the output frequency $f_o$ of the inverter 2 and the fundamental-harmonic output voltage $V_M$ thereof increase with the increase in the DC supply voltage as can be seen from FIG. 6. Therefore, the relationships between the output voltage of the inverter 2 and the current of the induction motor 3 become those shown by (I) and (II) in FIG. 7 and thereby the instantaneous peak value $i_{up}$ of the current in the induction motor 3 and the torque pulsations thereof do not become as large as in FIG. 4 even when the DC supply voltge increases from $E_{s1}$ to $E_{s2}$. When the value $i_{up}$ is found for each number of pulses, it is varied from that on the solid line (for $E_{s1}$) in FIG. 6 to that on the dashed line (for $E_{s2}$) therein, but it does not become as large as that shown in FIG. 3 even when the DC supply voltage increases from $E_{s1}$ to $E_{s2}$. Furthermore, when the DC supply voltage falls below $E_{s1}$, the maximum value of the fundamental-harmonic output voltage $V_M$ which the inverter 2 can deliver at each number of pulses also decreases. Accordingly, a set value of the output frequency $f_o$ of the inverter corresponding to this decrease for changing each number of pulses is varied so as to be smaller than the one at each of points (a)–(e) on the solid line (for $E_{s1}$) in FIG. 6, whereby the failure of the inverter 2 to interrupt (commutate) the current is eliminated.

Thus, even when the DC supply voltage changes, the reference value of the output frequency of the inverter for changing each number of pulses is varied corresponding to the change in the voltage, whereby the increase of the torque fluctuations when the number of pulses becomes one, the failure of the inverter 2 in commutation, and further the growth of the instantaneous peak value of the current in the induction motor 3 are all eliminated.

Next, corresponding also to the value of the current in the induction motor 3, the reference value of the output frequency $f_o$ of the inverter for changing the number of pulses in a half cycle of the output voltage of the inverter is adjusted. The following is an explanation of this operation with reference to FIG. 8.

Figure 8:
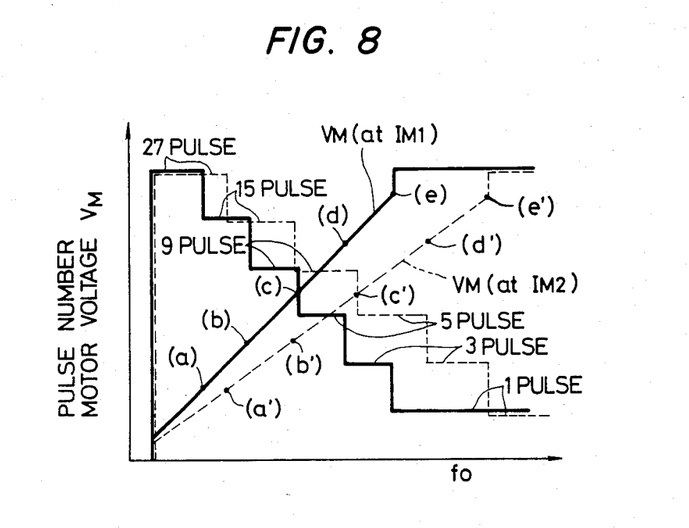
FIG. 8 is a graph showing the PWM operation in one embodiment of the present invention compared with that of FIG. 5.

When the value of the current instruction $I_{Mo}$ for the induction motor 3 delivered from a current instruction circuit 8 in FIG. 1 is reduced from $I_{M1}$ to $I_{M2}$ the fundamental-harmonic output voltage $V_M$ in relation to the output frequency $f_o$ of the inverter is reduced from that shown by the solid line (for $I_{M1}$) in FIG. 8 to that shown by the dashed line (for $I_{M2}$) therein. Then, the change in the current value is input to the pulse-number changing circuit 12, and reference values of the output frequency $f_o$ of the inverter corresponding to this change for changing the number of pulses are transferred from the points (a)–(e) on the solid line in FIG. 8 to the points (a')–(e') on the dashed line therein. Then, as can be seen from the dashed line in FIG. 8, the changes in the fundamental-harmonic output voltage $V_M$ of the inverter 2 when the number of pulses becomes one, i.e. the torque fluctuations at that time, are nearly the same as those shown by the solid line when the value of the reference of motor current is not reduced. Meanwhile, when the value of reference of motor current becomes greater than $I_{M1}$, the fundamental-harmonic output voltage $V_M$ of the inverter 2 in relation to the output frequency $f_o$ of the inverter becomes larger than that on the solid line (for $I_{M1}$) in FIG. 8. Then, by adjusting the set values of the output frequency $f_o$ of the inverter for changing the number of pulses so that they are smaller than the values shown by the points (a)–(e) on the solid line in FIG. 8 corresponding to this change, the usual failure of the inverter 2 to interrupt (commutate) the current is eliminated.

In this way, even when the value of the current instruction for the induction motor 3 changes, the reference value of the output frequency of the inverter for changing the number of pulses is adjusted corresponding to this change, and thus similar advantages, including that the torque fluctuations when the number of pulse becomes one does not increase and that the failure of the inverter 2 in commutation is eliminated, are obtained by changing the reference of motor current as well.

With reference to FIG. 1, the reference value of the output frequency $f_o$ of the inverter for changing the number of pulses in a half cycle of the output voltage of the inverter is adjusted corresponding to the magnitude of both DC supply voltage and the value of the current instruction $I_{Mo}$ for the induction motor 2. The operation in this case will be explained with reference to FIG. 9.

Figure 9:
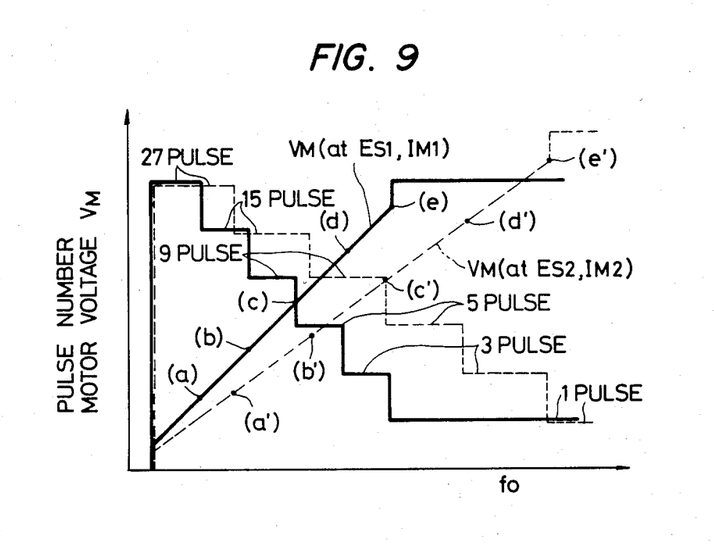
FIG. 9 is a graph of frequency against output voltage of the inverter, and the number of pulses thereof showing the PWM operation in one embodiment of the present invention under different supply voltage and motor current conditions.

When the voltage of the DC power source 1 increases from $E_{s1}$ to $E_{s2}$ and the value of the reference of motor current is decreased from $I_{M1}$ to $I_{M2}$, the fundamental-harmonic output voltage $V_M$ of the inverter 2 in relation to the output frequency $f_o$ of the inverter changes from that shown by the solid line (for $E_{s1}$ and $I_{M1}$) in FIG. 9 to that shown by the dashed line (for $E_{s2}$ and $I_{M2}$) therein, and therefore, corresponding to this change, the reference values of the output frequency $f_o$ of the inverter for changing the number of pulses is transferred from the points (a)–(e) on the solid line in FIG. 9 to the points (a')–(e') on the dashed line therein. Furthermore, when the points (a')–(e') are set, an increase of the maximum value of the fundamental-harmonic output voltage $V_M$ which the inverter 2 can deliver at each number of pulses by the increase of the DC supply voltage in taken into consideration. (For instance, at 15 pulses, the increase of the maximum value of the fundamental-harmonic output voltage $V_M$ the inverter 2 can deliver is the difference between the points (b') and (b) in FIG. 9.) In addition, when the DC supply voltage falls below $E_{s1}$, or when the value of the current instruction for the induction motor 3 increases above $I_{M1}$, the reference values of the output frequency $f_o$ of the inverter for changing the number of pulses is adjusted likewise corresponding to the changes in both of them, and thereby effects the aforesaid advantages, i.e. the effects that the growth of torque fluctuations when the number of pulses becomes one, the failure of the inverter 2 in commutation, and the growth of the instantaneous peak values (torque pulsations) of the current in the induction motor 3 are eliminated.

Incidently, in FIG. 1, the change of the number of pulses is executed when the output frequency $f_o$ of the inverter reaches a reference value. This may also be executed, as stated before, when the rotationed speed $f_n$ of the induction motor 3 reaches a reference value or when the output voltage of the inverter reaches a reference value.

As is explained above, according to the present invention, the reference values related to the rotational speed of the induction motor for changing the number of pulses is adjusted corresponding to changes in the DC supply voltage or in the value of the current instruction for the induction motor, and therefore, torque fluctuations and the failure of the inverter in commutation can be eliminated, and further the changes in the instantaneous peak values of the current in the induction motor, which are essential for deciding the commutation ability of the inverter, and in making the torque pulsations accompanying it small, in relation to the changes in the DC supply voltage, or in the value of the reference of motor current.

We claim:

1. A control device comprising an inverter for converting direct current from a DC supply to alternating current and for feeding converted alternating current to an induction motor, a pulse-width modulation controlling device containing a means for sequentially changing the number of pulses in a half cycle of the output voltage of the inverter so as to control the output voltage and output frequency of the inverter in relation to the rotational speed of the induction motor, and means for adjusting a reference value related to the rotational speed for changing said number of pulses in the half cycle of the output voltage of the inverter in accordance with an output voltage of the DC supply.

2. A control device according to claim 1, wherein said pulse-width modulation controlling device has a modulation part conducting pulse-width modulation through the comparison of a sine wave having the frequency of the operating frequency instruction for the inverter with a triangular wave having a frequency which is an integral multiple of that of the sine wave and wherein said pulse-number changing means including means for changing the frequency of said triangular wave.

3. A control system for an induction motor comprising:
   an inverter for converting direct current from a DC supply to alternating current and for feeding the alternating current to the induction motor;
   a pulse-width modulation (PWM) controlling means for controlling the output voltage and output frequency of the inverter, the PWM controlling means including means for sequentially changing the number of pulses contained in a half cycle of the output voltage of the inverter every time a signal representative of rotational speed of the induction motor reaches one of plural predetermined reference values;
   means for detecting the DC supply voltage; and
   means for adjusting the predetermined reference values in accordance with the output of the detecting means.

4. The control system according to claim 3, wherein the signal representative of the rotational speed is an operating frequency instruction for the inverter supplied to the PWM controlling means.

5. The control system according to claim 3, wherein the PWM controlling means includes a modulation part conducting pulse-width modulation through the comparison of a sine wave having the frequency of the operating frequency instruction for the inverter with a triangular wave having a frequency which is an integral multiple of the frequency of the sine wave, the pulse-number changing means including means for changing the frequency of the triangular wave.

6. A control system for an induction motor comprising:
   an inverter for converting direct current to alternating current and for feeding the alternating current to the induction motor;
   a pulse-width modulation (PWM) controlling means for controlling the output voltage and output frequency of the inverter, the PWM controlling means including means for sequentially changing the number of pulses contained in a half cycle of the output voltage of the inverter every time a signal representative of the rotational speed of the induction motor reaches one of plural predetermined reference values;
   means for detecting the motor current; and
   means for adjusting the predetermined reference values in accordance with the output of the detecting means.

7. The control system according to claim 6, wherein the signal representative of the rotational speed is an operating frequency instruction for the inverter supplied to the PWM controlling means.

8. The control system according to claim 6, wherein the PWM controlling means includes a modulation part conducting pulse-width modulation through the comparison of a sine wave having the frequency of the operating frequency instruction for the inverter with a triangular wave having a frequency which is an integral multiple of the frequency of the sine wave, pulse-number changing means including means for changing the frequency of the triangular wave.

9. The control system according to claim 6, further including means for controlling the motor current at a fixed level in cooperation with the PWM controlling means, adjusting means adjusting the plural predetermined reference values in accordance with a current instruction supplied to the motor current controlling means.

10. A control system for an induction motor comprising:
    an inverter for converting direct current from a DC supply to alternating current and for feeding the alternating current to the induction motor;
    a pulse-width modulation (PWM) controlling means for controlling the output voltage and output frequency of the inverter, the PWM controlling means including means for sequentially changing the number of pulses contained in a half cycle of the output voltage of the inverter every time a signal representative of the rotational speed of the induction motor reaches one of plural predetermined reference values;
    means for detecting the DC supply voltage;
    means for detecting the motor current; and
    means for adjusting the predetermined reference values in accordance with at least one of the outputs of the DC supply voltage detecting means and the motor current detecting means.

11. The control system according to claim 10, wherein the means for adjusting the predetermined reference values adjusts the predetermined reference values in accordance with the outputs of the DC supply voltage detecting means and the motor current detecting means.

12. A control system for induction motor comprising:

an inverter for converting direct current from a DC supply to alternating current and feeding the alternating current to the induction motor;

a pulse-width modulation (PWM) controlling means for controlling the output voltage and output frequency of the inverter, the PWM controlling means including means for sequentially changing the number of pulses contained in a half cycle of the output voltage of the inverter every time a signal representative of the rotational speed of the induction motor reaches one of plural predetermined reference values;

means for controlling the motor current at a fixed level in cooperation with the PWM controlling means;

means for detecting the DC supply voltage; and means for adjusting the predetermined reference values in accordance with at least one of the output of the detecting means and a current instruction supplied to the current controlling means.

13. The control system according to claim 12, wherein the means for adjusting the predetermined reference values adjusts the predetermined reference values in accordance with the output of the detecting means and the current instruction supplied to the current instruction supplied to the motor current controlling means.

14. The control system according to claim 12, wherein the signal representative of the rotational speed is an operating frequency instruction for the inverter supplied to the PWM controlling means.

15. The control system according to claim 12, wherein the PWM controlling means includes a modulation part conducting pulse-width modulation through the comparison of a sine wave having the frequency of the operating frequency instruction for the inverter with a triangular wave having a frequency which is an integral multiple of the frequency of the sine wave, the pulse-number changing means including means for changing the frequency of the triangular wave.

16. A control system for an induction motor comprising:

an inverter for converting direct current to alternating current and for feeding the alternating current to the induction motor;

a pulse-width modulation (PWM) controlling means for controlling the output voltage and output frequency of the inverter, the PWM controlling means including means for sequentially changing the number of pulses contained in a half cycle of the output voltage of the inverter every time a signal representative of the rotational speed of the induction motor reaches one of plural predetermined reference values;

means for detecting electrical fluctuations which are disturbances for a controlling system for the output voltage of the inverter; and means for adjusting the predetermined reference values in accordance with the output of the detecting means.

17. A control system for an induction motor comprising:

an inverter for converting direct current from a DC supply to alternating current and for feeding converter alternating current to the induction motor;

means for pulse-width modulating through comparison of a sine wave having a frequency of an operating frequency instruction for the inverter with a triangular wave having a frequency which is an integral multiple of the frequency of the sine wave for the purpose of controlling the output voltage and output frequency of the inverter; and means for changing the frequency of the triangular wave in accordance with the rotational speed of the motor and with at last one of the DC supply voltage and the current of the motor.

18. The control system according to claim 17, wherein the means for changing the frequency of the triangular wave changes the frequency in accordance with the rotational speed of the motor and the DC supply voltage.

19. The control system according to claim 17, wherein the means for changing the frequency of the triangular wave changes the frequency in accordance with the rotational speed of the motor and the current of the motor.

20. The control system according to claim 17, wherein the means for changing the frequency of the triangular wave changes the frequency in accordance with the rotational speed of the motor, the DC supply voltage and the current of the motor.

* * * * *